(12) United States Patent
McCarthy, Jr.

(10) Patent No.: US 6,712,045 B1
(45) Date of Patent: Mar. 30, 2004

(54) ENGINE CONTROL FOR A COMMON RAIL FUEL SYSTEM USING FUEL SPILL DETERMINATION

(75) Inventor: James E. McCarthy, Jr., Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 54 days.

(21) Appl. No.: 10/214,520

(22) Filed: Aug. 8, 2002

(51) Int. Cl.$^7$ ............................................... F02M 41/00
(52) U.S. Cl. ..................... 123/456; 73/119 A
(58) Field of Search ...................... 123/456, 458, 123/459, 457, 506, 946; 73/119 A

(56) References Cited

U.S. PATENT DOCUMENTS

| | | | | |
|---|---|---|---|---|
| 3,903,668 A | * | 9/1975 | Megumi | 52/405.3 |
| 4,903,668 A | * | 2/1990 | Ohata | 123/478 |
| 5,773,716 A | * | 6/1998 | Antonioli et al. | 73/119 A |

FOREIGN PATENT DOCUMENTS

JP 9177586 * 7/1997

* cited by examiner

*Primary Examiner*—Mahmoud Gimie
(74) *Attorney, Agent, or Firm*—Brooks Kushman P.C.

(57) ABSTRACT

A system and method for engine control determine a spilled fuel quantity for use in controlling pressure of a common rail fuel system. In one embodiment, a spilled fuel estimate is determined based on rail pressure and engine speed. Another embodiment determines a spilled fuel estimate based on a leakage quantity and a spill control quantity. The leakage quantity represents the amount of fuel leaked past the internal passages inside the injectors and is based on rail pressure alone. The spill control quantity is based on rail pressure and injector energizing time. The spill control quantity represents the fuel used to actuate the injector allowing the injected fuel into the cylinder during the combustion cycle. A more accurate determination of the quantity of fuel pumped based on spilled fuel and injected fuel may be used to improve the common rail pressure control, for example.

24 Claims, 5 Drawing Sheets

ENGINE CONTROL FOR A COMMON RAIL FUEL SYSTEM USING FUEL SPILL DETERMINATION

BACKGROUND OF THE INVENTION

1. Field of the Invention

The present invention relates to a system and method for controlling a multiple cylinder internal combustion engine having a common rail fuel system using a determination of fuel spill.

2. Background Art

Common rail fuel systems are used in various types of multiple cylinder internal combustion engines, such as diesel engines, for example. An accumulator or rail is used to distribute fuel to injectors or nozzles associated with each cylinder of the engine. An engine control module communicates with various engine components including one or more fuel pumps and fuel injectors to meter the fuel delivered to each cylinder, i.e. control the quantity and timing of the fuel delivery to ultimately control the performance and emissions of the engine. The timing and quantity of the fuel delivered to each cylinder in one or more injections during each combustion cycle depends in part upon the pressure within the common rail, the energizing time of the injector solenoid, and the electromechanical response of the injector. Conventional control theory using proportional (P), integral (I), and/or derivative (D) feedback control, often in combination with open-loop feed forward (FF) control, may be used to control the pressure within the common rail by controlling the volume of fuel supplied by one or more pumps during the combustion process. The gains for the feedback controller and the open loop set points for the feed forward control are usually determined by trial and error during calibration of the engine.

To determine the amount of fuel that needs to be pumped from the fuel supply to the common rail to replace the fuel used during the combustion process and maintain a desired rail pressure, one prior art approach uses an estimate or determination of injected fuel quantity. While this approach may be acceptable for some applications, the present inventor has recognized an opportunity to improve the pressure control for common rail systems that may result in improved performance, fuel economy, and reduced emissions, particularly during transient conditions.

DISCLOSURE OF THE INVENTION

The present invention provides a system and method for controlling a multiple cylinder internal combustion engine using a determination of a quantity of fuel pumped rather than the quantity of fuel injected during the combustion cycle. The quantity of fuel pumped is determined using an estimate of spilled fuel in addition to the quantity of injected fuel. The spilled fuel or return fuel is the fuel supplied by the pump that is not injected into the cylinders, but is used to actuate the injectors (control fuel) or that leaks past the internal components of the injectors (leaked fuel) and is returned to the fuel supply. In one embodiment, a spilled fuel estimate is determined based on rail pressure and engine speed. Another embodiment determines a spilled fuel estimate based on separate determinations of a leakage quantity and a spill control quantity. The leakage quantity represents the amount of fuel leaked past the internal passages inside the injectors and is based on rail pressure alone. In one embodiment, the leakage quantity represents the leaked fuel quantity for all of the injectors in units of liters/hour. The spill control quantity is based on rail pressure and injector energizing time. The spill control quantity represents the fuel used to operate the injector and allow the injected fuel into the cylinder during the combustion cycle. In one embodiment, the control quantity is specified in cubic millimeters per cylinder per cycle based on a rail pressure specified in units of bar and an injector energizing time specified in units of microseconds.

The present invention also includes computer readable storage media having stored instructions executable by a computer to control rail pressure of a common rail fluid distribution system in an internal combustion engine.

The present invention provides a number of advantages. For example, the present invention provides more accurate common rail pressure control using a determination of spilled fuel based on current engine operating parameters. A more accurate determination of spilled fuel may facilitate engine calibration and ultimately be used to adjust the control system to improve performance and reduce emissions. For example, the present invention provides a more accurate means for populating a feed forward table used in open loop control. This allows the feedback controller gains to be adjusted to provide a quicker response for the rail pressure governor because an optimized feed forward table reduces the necessary contribution of the feedback controller to maintain the desired common rail pressure throughout the one or more injection events for each cylinder during each combustion cycle. In addition, an accurate spilled fuel determination facilitates detection of fuel leaks. Furthermore, separate determinations of control fuel and leaked fuel may require less memory (and a resulting reduction in calibration effort) than a single determination of spilled fuel.

Various other advantages and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
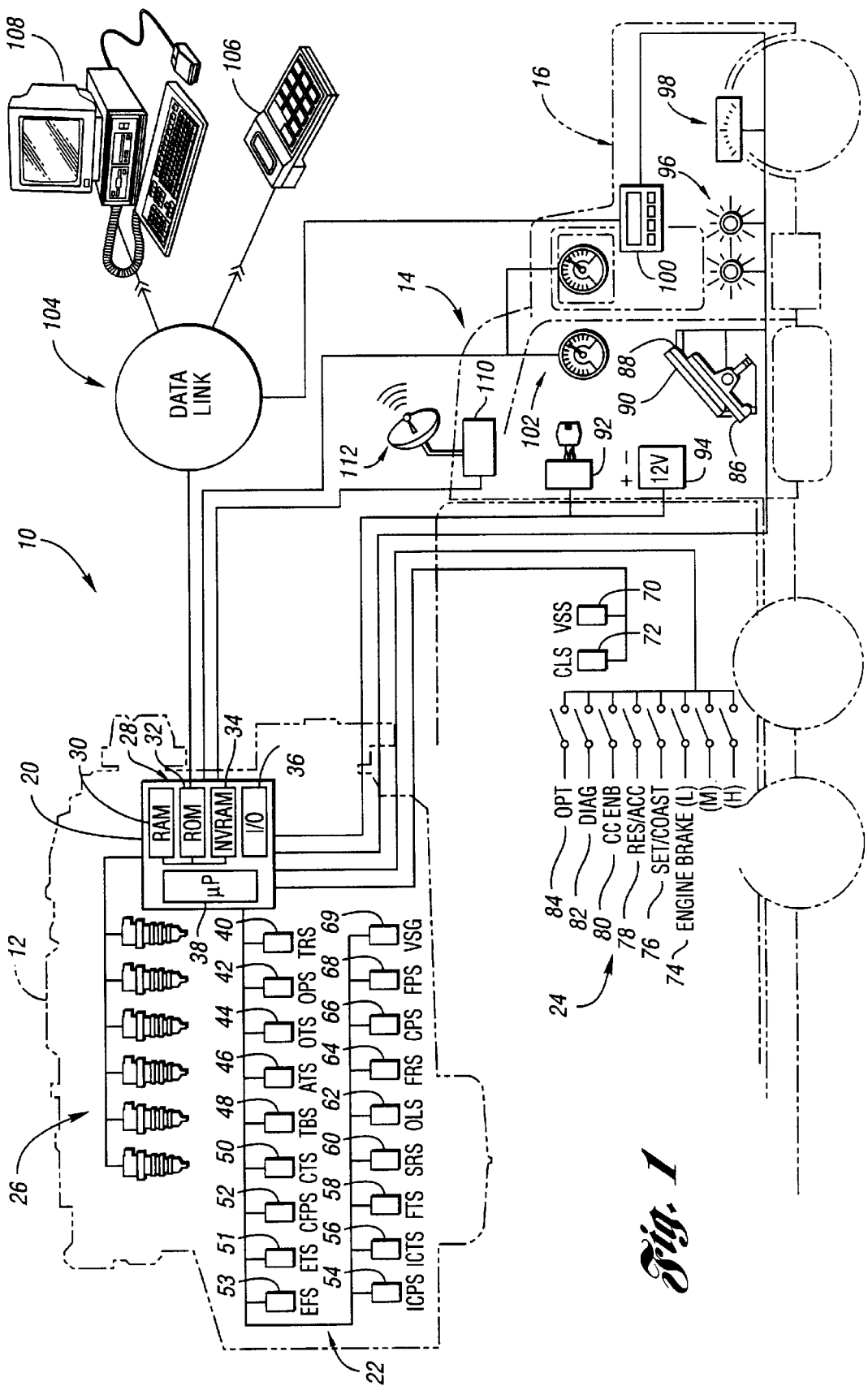
FIG. 1 is a schematic/block diagram illustrating operation of a system or method for engine control using a spilled fuel determination according to one embodiment of the present invention.

FIG. 1 provides a schematic/block diagram illustrating operation of a system or method for controlling a multi-cylinder internal combustion engine having a common rail fuel system using a spilled fuel determination according to one embodiment of the present invention. System 10 includes a multi-cylinder compression ignition internal combustion engine, such as a diesel engine 12, which may be installed in a vehicle 14 depending upon the particular application. In one embodiment, vehicle 14 includes a tractor/semi-trailer 16. Diesel engine 12 is installed in tractor/semi-trailer 16 and interfaces with various sensors and actuators located on engine 12 and tractor/semi-trailer 16 via engine and vehicle wiring harnesses. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as a high pressure pump and/or proportioning valve (FIG. 2) and/or fuel injectors 26, for example. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and non-volatile memory (NVRAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and/or combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, DVD, and the like.

In a typical application, ECM 20 processes inputs from engine sensors 22, and vehicle sensors/switches 24 by executing instructions stored in computer-readable storage media 28 to generate appropriate output signals for control of engine 12 via corresponding actuators. In one embodiment of the present invention, engine sensors 22 include a timing reference sensor (TRS) 40 which provides an indication of the crankshaft position and may be used to determine engine speed, preferably in revolutions per minute (rpm). An oil pressure sensor (OPS) 42 and oil temperature sensor (OTS) 44 are used to monitor the pressure and temperature of the engine oil, respectively. One or more fluid temperatures, such as the oil temperature, may be used in controlling the engine by determining a desired rail pressure set point, for example, as described in greater detail below.

An air temperature sensor (ATS) 46 is used to provide an indication of the current intake or ambient air temperature. A turbo boost sensor (TBS) 48 is used to provide an indication of the boost pressure of a turbocharger which is preferably a variable geometry or variable nozzle turbocharger. As known by those of ordinary skill in the art, TBS 48 may also be used to provide an indication of the intake manifold pressure. Coolant temperature sensor (CTS) 50 is used to provide an indication of the coolant temperature. Depending upon the particular engine configuration and application, various additional sensors may be included. For example, engines which utilize exhaust gas recirculation (EGR) preferably include an EGR temperature sensor (ETS) 51 and an EGR flow sensor (EFS) 53.

Common rail fluid distribution systems may include one or more pressure sensors to detect the pressure within the common rail and provide a corresponding signal to the pressure controller within the ECM 20. A common rail fuel system preferably includes a corresponding fuel pressure sensor (CFPS) 52. Similarly, an intercooler coolant pressure sensor (ICPS) 54 and temperature sensor (ICTS) 56 may be provided to sense the pressure and temperature, respectively, of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration, such as used in some stationary generator applications, for example.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) 70 which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84, such as a high idle switch, for example. ECM 20 also receives signals associated with an accelerator or foot pedal 86, a clutch 88, and a brake 90. ECM 20 may also monitor position of a key switch or ignition switch 92 and a system voltage provided by a vehicle battery 94 to determine current operating conditions and control engine 12 and/or vehicle 14.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic used to determine or estimate spilled or returned fuel to be used by the common rail pressure controller or governor, preferably also implemented primarily by control logic within ECM 20. As described in greater detail below, ECM 20 may determine spilled fuel in a single look-up based on engine speed and current rail pressure. Alternatively, a spilled fuel control quantity may be determined in a first look-up based on injector energizing time and current rail pressure, and a spilled fuel leaked quantity may be determined in a second look-up based only on current rail pressure. The spilled fuel, or control fuel and leaked fuel, may then be used in combination with injected fuel to determine fuel pump output, which may be used by the common rail pressure controller to achieve a desired common rail pressure.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14. Similarly, transceiver 110 and antenna 112 may be used to wirelessly send and/or receive program, diagnostic, or other information.

Figure 2:
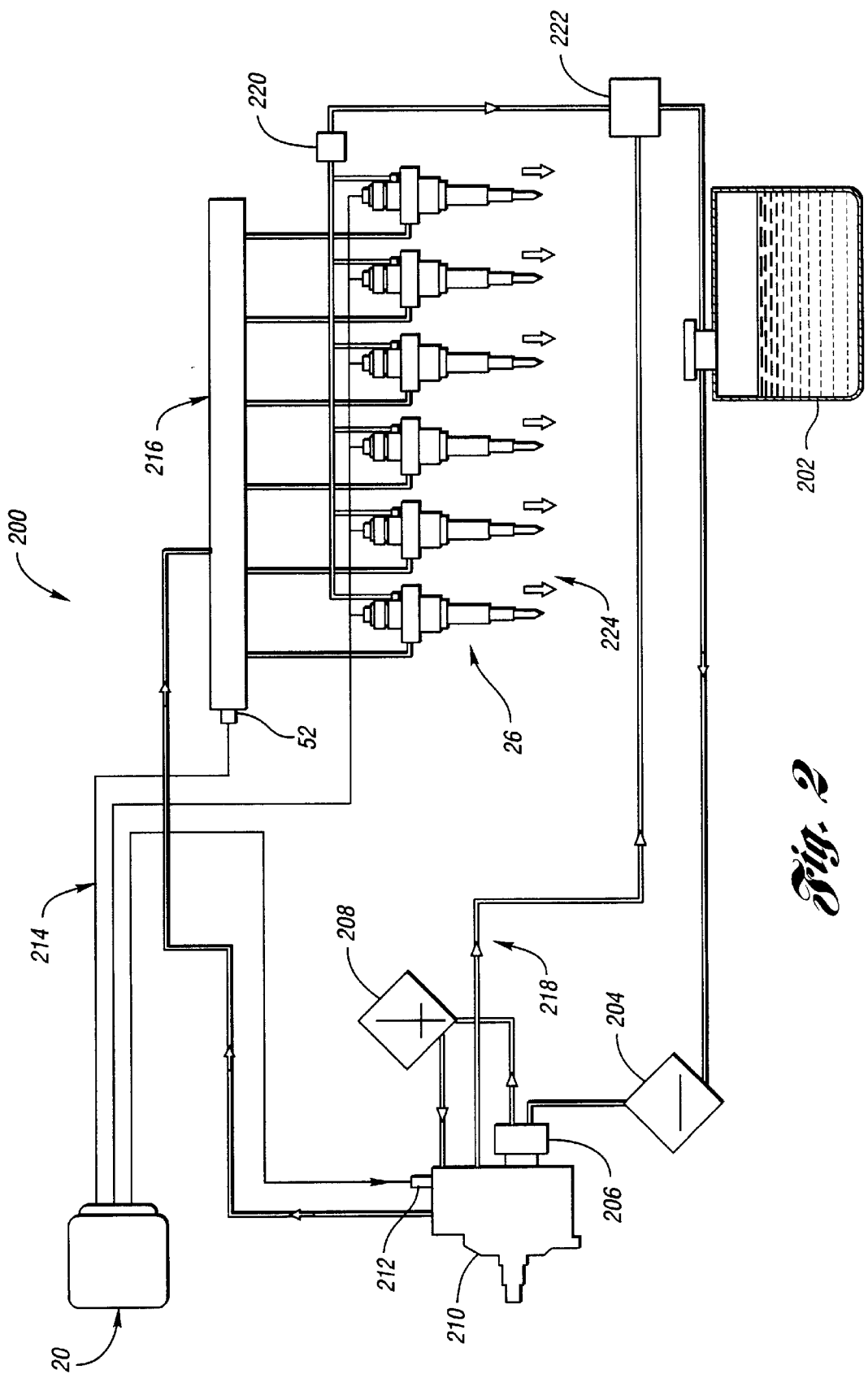
FIG. 2 is a block diagram illustrating a common rail fuel system with a pressure control strategy using a spilled fuel determination according to one embodiment of the present invention.

FIG. 2 is a block diagram illustrating a common rail fuel system with a pressure control strategy using a spilled fuel determination according to one embodiment of the present invention. Common rail fluid distribution system 200 is used to deliver fuel from a fuel tank 202. Low-pressure gear pump 206 draws fuel from fuel tank 202 via a primary fuel filter 204 and pumps the fuel through a secondary filter 208 into a high-pressure pump 210. A fuel metering valve or proportional valve 212 is electronically controlled by ECM 20 via wiring harness 214 to direct fuel into a high-pressure plunger cavity of high-pressure pump 210. The remaining fuel is spilled or returned as represented by 218 to junction block 222 where it is combined with injector spill fuel from injectors 26 and returned to fuel tank 202. Metering valve 212 is preferably an integral component of high-pressure pump 210 to reduce losses. However, implementations using a discrete metering valve or multiple metering valves may be appropriate for certain applications and are within the scope of the present invention. As used throughout this description, control of high-pressure pump 210 is used interchangeably with control of metering valve 212. In actual operation, high-pressure pump 210 may be turned on or off separately from control or modulation of metering valve 212. A rail pressure governor or controller implemented within ECM 20 controls the amount of current sent to metering valve 212 to control the amount of fuel (and therefore the pressure) delivered to common rail 216 as explained in greater detail below.

In general, the rail pressure governor controls metering valve 212 based upon a desired rail pressure and measured rail pressure (determined by pressure sensor 52, for example, and communicated to ECM 20 via wiring harness 214) with control system parameters or gains determined according to current engine operating conditions. PID controller gains of the rail pressure governor may be fixed, or may vary based on current operating conditions. In one preferred embodiment, the PID gains vary based on pump output per unit time with the pump output determined using an aggregate spilled fuel determination, or alternatively, a spilled fuel control quantity and a spilled fuel leaked quantity. A feed forward controller provides open-loop control with its open loop setpoint based on pumped fuel quantity and engine speed or alternatively pump output per unit time.

It should be noted that pump speed could be used in place of engine speed and that engine load could be used in place of injected or pumped fuel quantity. In addition, injected fuel quantity could be used in place of pumped fuel quantity for the feed forward controller of the rail pressure governor. The rail pressure governor or controller attempts to reduce the pressure error or deviation between the desired and actual rail pressure to maintain the fuel pressure in high-pressure rail 216 by modulating metering valve 212 to control the amount of fuel supplied by high-pressure pump 210. The present invention improves the pressure control by providing a more accurate determination of spilled fuel, which is used in determining pump output.

Common rail 216 is used to deliver pressurized fuel to a plurality of engine locations. In this embodiment, the plurality of engine locations correspond to injectors 26, each associated with an engine cylinder (not specifically illustrated). Injectors 26 are actuated by ECM 20 via wiring harness 214 in electrical communication with corresponding injector solenoids to control the quantity and timing of injected fuel 224 for each cylinder. As known by those of ordinary skill in the art, the quantity and timing of fuel injected into the combustion chamber of each cylinder is also a function of the pressure within common rail 216. As such, continuous and accurate control of the pressure within common rail 216 is beneficial to improve emissions, efficiency, and drivability. As described in greater detail with reference to FIGS. 4–6, typical fuel injectors use pressurized fuel from common rail 216 to control actuation of the injector needle. This control fuel, along with fuel that leaks through internal injector passages, is referred to as spilled fuel since it is not injected into the cylinders but rather returned to the fuel supply. A regulator valve 220 regulates the combined injector spill fuel pressure to provide back pressure to the injector spill at each injector exit. The pressure drop from each injector exit to the pressure regulator is negligible assuming a sufficiently large channel for the combined return fuel. The injector spilled fuel is then combined with pump spilled fuel at junction block 222 before being returned to fuel tank 202.

Figure 3:
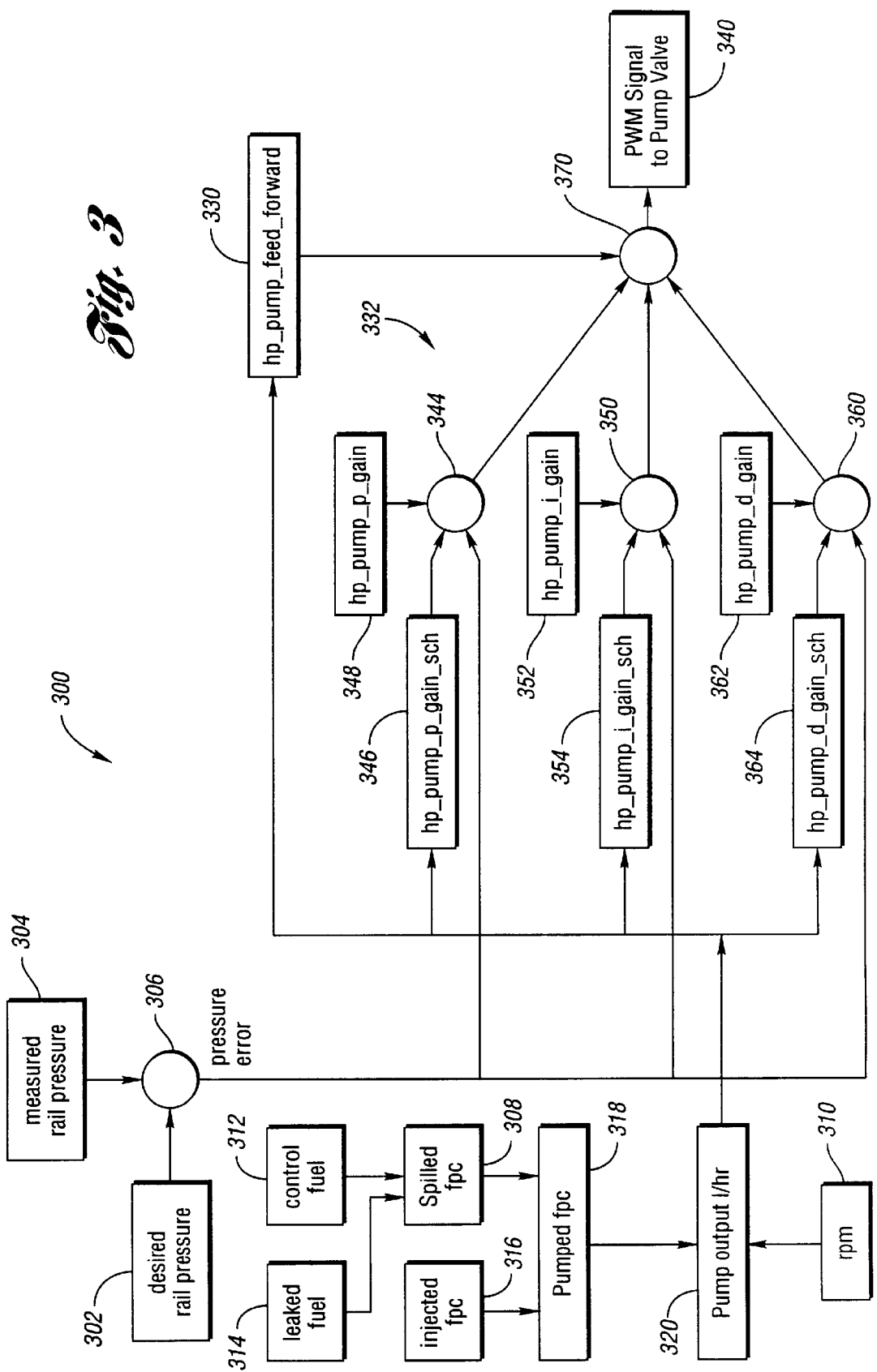
FIG. 3 is a block diagram illustrating one embodiment for engine control using a rail pressure governor having pump output determined using spilled fuel according to the present invention.

FIG. 3 is a block diagram illustrating one embodiment for a rail pressure governor having variable gains based on pump output determined using a spilled fuel estimate or determination according to the present invention. Rail pressure governor 300 determines a desired rail pressure based on a current engine operating conditions or modes as represented by block 302. The desired rail pressure or rail pressure setpoint is preferably determined as described in commonly owned and copending U.S. patent application Ser. No. 10/214,550 titled "Injection Control For A Common Rail Fuel System", the disclosure of which is hereby incorporated by reference in its entirety. However, the present invention is independent of the particular method used to determine the desired rail pressure as represented by block 302. A measured or inferred rail pressure is determined as represented by block 304 and is used to determine a rail pressure error or deviation at block 306. Measured or inferred (current) rail pressure 304 is also used in one embodiment in combination with engine speed 310 to determine an aggregate spilled fuel per cycle 308. In one preferred embodiment, separate determinations or estimates of spilled control fuel 312 and leaked fuel 314 are used to determine a total spilled fuel per cycle 308 with control fuel 312 determined based on rail pressure 304 and injector energizing time (not specifically illustrated) and leaked fuel 314 based only on rail pressure 304. Control fuel 312 represents the fuel used during actuation of the injectors and increases with injector energizing time. Leaked fuel 314 represents fuel that leaks past internal components of the fuel injectors and is generally independent of the engine speed or injection events. Spilled fuel per cycle (whether determined in aggregate, based on leaked fuel, or based on leaked fuel and control fuel) is used in combination with injected fuel per cycle 316 to determine pumped fuel per cycle 318 and ultimately pump output 320. Because leaked fuel is primarily a function of rail pressure 304, this component or contributor of spilled fuel may be specified in units of liters/hour and contribute directly to the calculation of pump output 320 rather than being specified as a "per cycle" quantity as illustrated in FIG. 3 depending upon the particular application and implementation.

In one embodiment, an aggregate spilled fuel per cycle is stored in a two-dimensional look-up table accessed by engine speed 310 and rail pressure 304. The two-dimensional look-up table is a 17×17 table occupying 289 memory locations. The aggregate spilled fuel per cycle provides an acceptable estimate of spilled fuel for use by the rail pressure governor for some applications. However, separating the spilled fuel quantity into a control fuel quantity 312 and leaked fuel quantity 314 provides a more accurate determination of spilled fuel and therefore pump output, which may provide more accurate pressure control. In addition, in this embodiment, the control fuel quantities are stored in a two-dimensional (9×17) look-up table accessed by injector energizing time and rail pressure with the leaked fuel quantities stored in a one-dimensional look-up table (17×1) accessed by rail pressure. As such this approach requires somewhat less memory (170 locations) with a corresponding reduction in calibration effort and improved control. The injector spilled fuel control quantities and injector spilled fuel leakage quantities for populating the look-up tables may be determined as described and illustrated with reference to FIGS. 4–6.

As summarized above, pump output per unit time is determined as represented by block 320 based on engine speed 310 and pumped fuel per cycle 318, which in turn is based upon injected fuel per cycle 316 and spilled fuel per cycle 308, or alternatively control fuel 312 and leaked fuel 314. Where control fuel 312 and leaked fuel 314 are used, pump output for a four stroke (cycle) engine may be determined according to:

$$PO = FPC + SCQ + \frac{SL}{RPM} \cdot \frac{10^6 \text{ mm}^3}{L} \cdot \frac{1 \text{ hr}}{60 \text{ min}} \cdot \frac{2 \text{ rev}}{\text{cyc}} \cdot \frac{engine}{\#CYL}$$

where PO represents pump output in cubic milliliters per cylinder per cycle, FPC represents injected fuel in cubic millimeters per cylinder per cycle, SCQ represents spilled injector control quantity in cubic millimeters per cylinder per cycle, SL represents spilled injector leak quantity in liters per hour, RPM represents engine speed in revolutions per minute, and #CYL represents the number of engine cylinders. Pump output is then preferably converted into units of liters per hour for use by the PID controller and feed forward tables.

A feed forward open loop set point 330 may be determined based on pump output 320 and used in combination with PID feedback controller 332 to generate a command signal 340 for the fuel pump and/or proportioning valve. PID controller 332 calculates a proportional term at block 344 preferably using a variable proportional gain 346 (preferably a single column) based on pump output 320, a high-pressure pump proportional gain 348 (preferably a programmable constant or scalar) and pressure error 306. Similarly, PID controller 332 determines an integral term at block 350 based on high-pressure pump integral gain 352 (preferably a programmable constant or scalar), variable integral gain 354 determined based on pump output 320, and pressure error 306. Likewise, PID controller 332 determines a derivative term at block 360 based on high-pressure pump derivative gain 362 (preferably a programmable constant or scalar), variable derivative gain 364 based on pump output 320, and pressure error 306. The various control terms are combined at block 370 to determine an appropriate control signal for the high-pressure pump or metering valve as represented by block 340.

Figure 4:
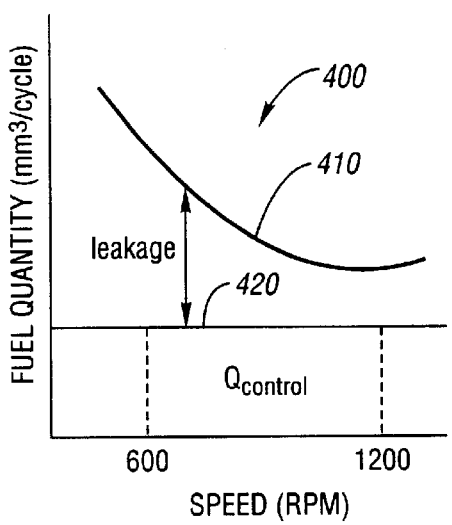
FIG. 4 is a graph illustrating fuel quantity per cycle as a function of engine speed for leaked fuel and control fuel determinations according to one embodiment of the present invention.
Figure 5:
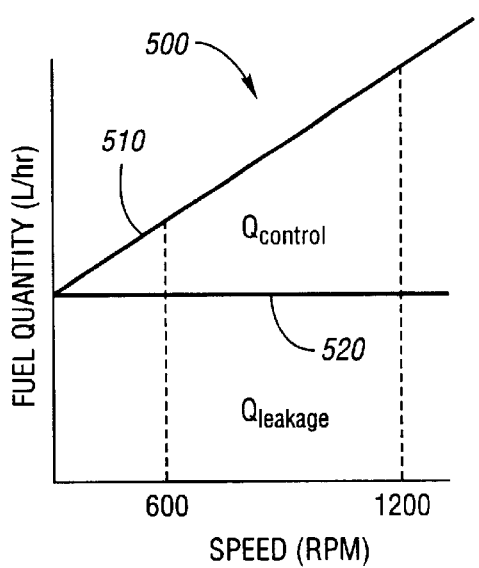
FIG. 5 is a graph illustrating fuel quantity in liters per hour as a function of engine speed for leaked fuel and control fuel determinations according to one embodiment of the present invention.

FIGS. 4 and 5 provide graphs illustrating one method for determining fuel spill control quantities and leaked quantities for use in controlling rail pressure according to the present invention. Graph 400 of FIG. 4 illustrates fuel quantity per cycle as a function of engine speed for leaked fuel 410 and control fuel 420 determinations in a typical application according to one embodiment of the present invention. Graph 500 of FIG. 5 illustrates fuel quantity in liters per hour as a function of engine speed for spilled control fuel 510 and spilled leakage fuel 520. Both graphs assume a constant rail pressure and a constant injected fuel quantity per cylinder per cycle. Values are generally determined empirically and used to populate corresponding look-up tables as described above. However, other methods may be used alone or in combination with empirical determinations to generate calibration information for a particular application.

As shown in FIG. 4, leaked fuel per cycle 410 decreases as engine speed increases due to the shorter cycle durations and generally constant leakage rate, which varies primarily as a function of rail pressure. Fuel control quantity 420, which varies primarily as a function of injector energizing time and rail pressure, is relatively constant for each cycle for the constant injected fuel per cycle and constant rail pressure.

As shown in FIG. 5, spilled leakage fuel 520 specified as a rate in liters/hour is generally constant because it varies primarily as a function of rail pressure, which is assumed constant in this illustration. Spilled control fuel quantity 510 increases generally linearly with increasing engine speed because of the corresponding increasing number of cycles per hour with a constant control quantity per cycle (420, FIG. 4).

Using the relationship between spilled control fuel and spilled leakage fuel at two arbitrary operating points (600 rpm and 1200 rpm, for example) provides two equations and two unknowns that may be easily solved to determine the control quantities and leakage quantities. Alternatively, spilled leakage fuel may be determined by varying rail pressure and not injecting any fuel. As such, no spilled control fuel is used and all of the injector spilled fuel comes from leakage. Once the leakage fuel is determined, control fuel can be determined accordingly. The spilled control fuel and spilled leakage fuel may then be used in determining pump output and controlling the proportioning valve (or equivalently the high pressure fuel pump) to provide a desired common rail pressure as described above.

Figure 6:
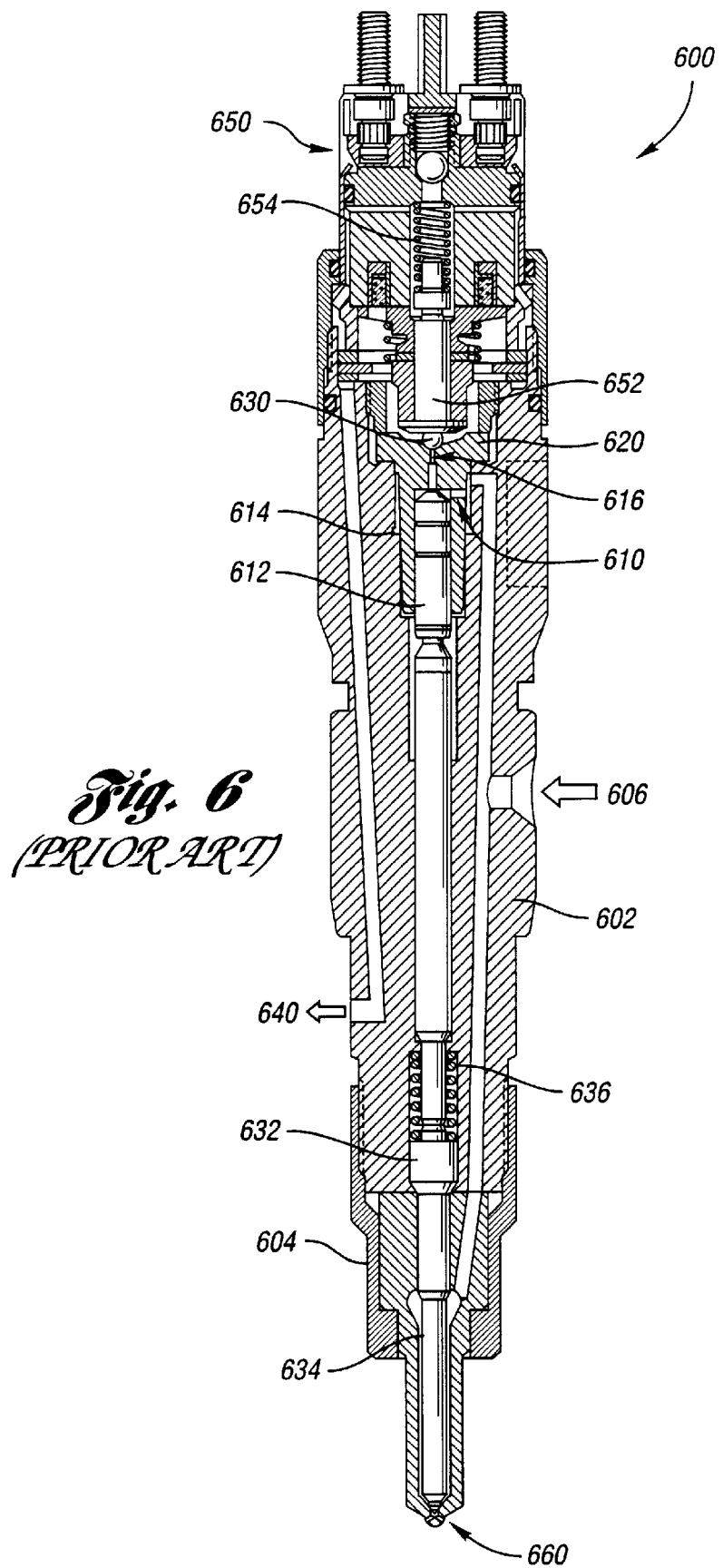
FIG. 6 is a cross section of a representative fuel injector illustrating flow passages for control fuel, leaked fuel, and injected fuel used in determining spilled fuel according to one embodiment of the present invention.

FIG. 6 is a cross section of a representative prior art fuel injector illustrating flow passages for control fuel, leaked fuel, and injected fuel as used in determining spilled fuel according to one embodiment of the present invention. Injector 600 includes an injector body 602 with a nozzle nut 604 to secure the bottom portion of injector 600 within a corresponding engine cylinder. A number of internal injector components cooperate to deliver a quantity of injected fuel to the corresponding cylinder in response to a command signal from the engine controller. When installed in a running engine, the common rail fuel system provides high pressure fuel to high pressure supply 606. The pressurized fuel travels through a controlled entrance orifice or z-hole 610 within valve piece 620 and exerts a downward sealing force on push rod 612. The high pressure fuel is primarily contained by sealing ring 614 and selectively allowed to flow through a controlled exit orifice or a-hole 616 within valve piece 620 during injector actuation when valve ball 630 is allowed to move off its seat. When the injector is off, the force exerted by high pressure fuel on push rod 612, which is proportional to the area of the top surface of push rod 612, is transferred to intermediate pin 632 and needle 634. This downward force, in addition to force exerted by nozzle spring 636 on intermediate pin 632, overcomes the upward force created by the high pressure fuel acting on needle 634 to keep needle 634 against its seat and prevents fuel from entering the cylinder. Any fuel that leaks past the internal injector components, such as high pressure sealing ring 614, valve piece 620, or valve ball 630, for example, is spilled leakage fuel and is returned to the fuel supply via fuel return 640. As described and illustrated in FIG. 2, the return or spilled fuel pressure is maintained by pressure regulator 220 to about 1.3–2.0 bar absolute in one embodiment.

During actuation of injector 600, solenoid assembly 650 receives a command signal from the engine controller that energizes solenoid assembly 650 lifting armature pin 652 against the force of valve spring 654. This allows valve ball 630 to move off its seat and high pressure fuel to flow through exit orifice (a-hole) 630 and into the fuel return passage 640. This fuel is the spilled injector control fuel. The area of the exit orifice is larger than the area of the entrance orifice such that the flow of fuel through the control chamber lowers the control chamber pressure (and resulting force on push rod 612) relative to the high pressure supply 606. This allows the upward force exerted by nozzle needle 634 (still subjected to high pressure supply 606) to overcome the downward force exerted by nozzle spring 636 and push rod 612 such that needle 634 lifts off its seat and allows high pressure fuel to enter the cylinder through nozzle tip 660. When the injector command signal is turned off, valve spring 654 forces valve ball 630 back onto its seat to increase the control chamber pressure forcing needle 634 to close and injection to stop.

As recognized by the present inventor, an analysis of injector operation as described above and verified by empirical results, the quantity of injector spilled control fuel varies as a function of injector energizing time and common rail pressure, while injector spilled leakage fuel is generally independent of injector energizing time and varies only with common rail pressure.

Figure 7:
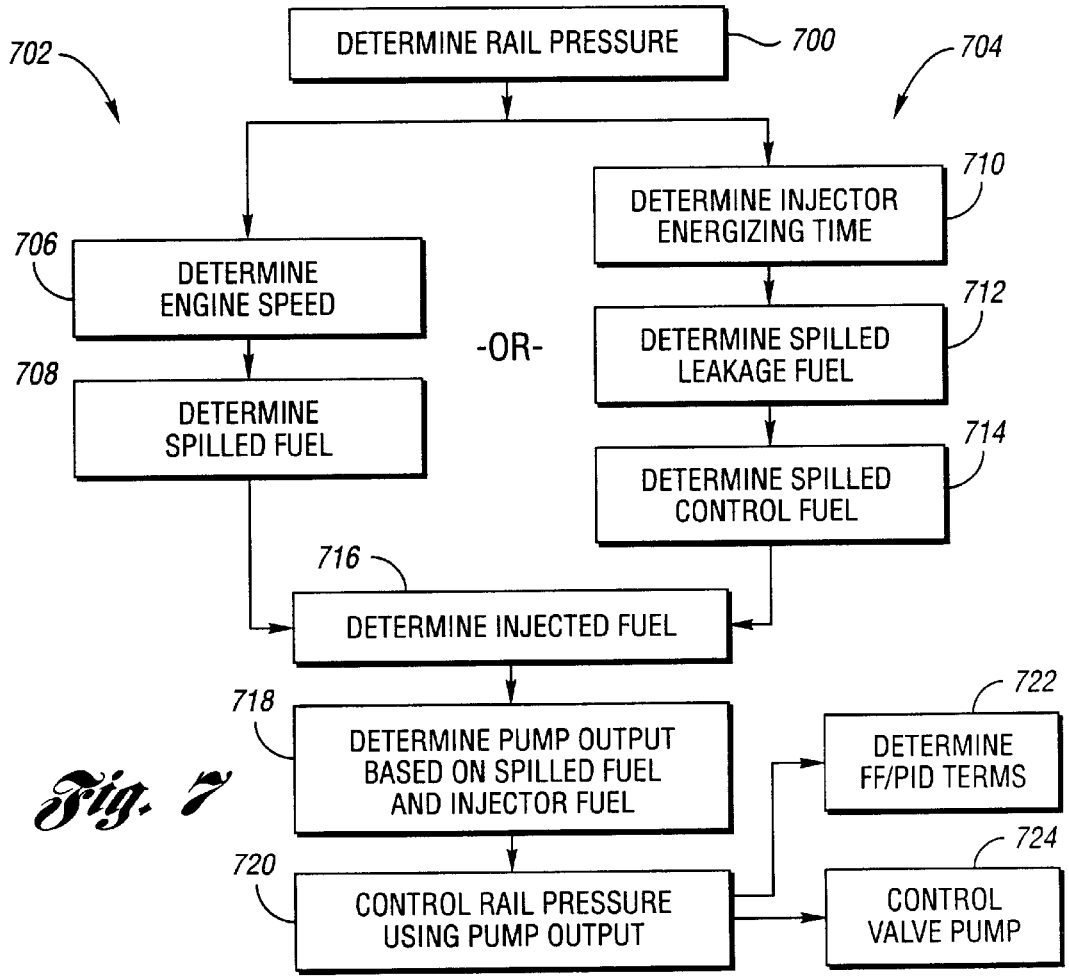
FIG. 7 is a flow chart illustrating operation of a system or method for engine control using a spilled fuel determination according to one embodiment of the present invention.

A block diagram illustrating operation of one embodiment for a system or method for controlling an engine with a common rail fluid distribution system using a spilled fuel determination according to the present invention is shown in FIG. 7. As will be appreciated by one of ordinary skill in the art, the block diagram of FIG. 7 represents control logic which may be implemented in hardware, or effected in software, or a combination of hardware and software. The various functions are preferably effected by a programmed microprocessor, such as included in the DDEC controller manufactured by Detroit Diesel Corporation, Detroit, Mich. Of course, control of the engine/vehicle and/or associated components may include one or more functions implemented by dedicated electric, electronic, or integrated circuits or controllers. As will also be appreciated by those of skill in the art, the control logic may be implemented using any of a number of known programming and processing techniques or strategies and is not limited to the order or sequence illustrated in FIG. 7. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information and diagnostic information. Although not explicitly illustrated, various steps or functions may be repeatedly performed depending on the type of processing employed.

In the representative embodiment of the present invention illustrated in FIG. 7, block 700 determines a rail pressure within the common rail fuel distribution system. As described above, the rail pressure is preferably determined using a signal from a corresponding sensor. However, the rail pressure may be determined using other methods, such as inferring or estimating the rail pressure from various other engine operating parameters. Depending upon the particular embodiment, the spilled fuel may be determined as represented by path 702 or path 704. For the embodiment represented by path 702, engine speed is determined as represented by block 706. A spilled fuel estimate is then determined using the rail pressure determined in block 700 and the engine speed determined in block 706 as represented by block 708. As described above, the spilled fuel estimate may be stored in a two-dimensional look up table accessed by rail pressure and engine speed. Alternatively, the embodiment illustrated by path 704 determines an injector energizing time as represented by block 710. Injector spilled leakage fuel is then determined, preferably using a lookup table indexed by rail pressure, as represented by block 712. Rail pressure and injector energizing time are then used to determine an injector spilled control fuel quantity as represented by block 714.

Block 716 determines the amount of injected fuel. The pump output may then be determined based on the spilled fuel determination and the injected fuel determination as represented by block 718. The rail pressure is then controlled using the pump output as represented by block 720. Pressure control may include determination of corresponding feed forward and feedback (PID) terms as represented by block 722. An appropriate command signal is then generated to control a proportioning valve and/or high pressure fuel pump as represented by block 724 to provide the desired common rail pressure.

As described above, the present invention provides various systems and methods for determining injector spilled fuel for use in controlling pressure in a common rail fluid distribution system. The invention may be used to improve performance and emissions for common rail systems and may lead to improved driveability in vehicle applications. Some embodiments may reduce necessary calibration effort and controller memory requirements while also improving control accuracy relative to prior art approaches.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention as described and claimed.

What is claimed is:

1. A method for controlling a multiple cylinder internal combustion engine having a common rail fuel distribution system, the method comprising:
   determining engine speed;
   determining rail pressure;
   determining a spilled fuel quantity based on the engine speed and the rail pressure; and
   controlling pressure within the common rail fuel distribution system using the spilled fuel quantity.

2. The method of claim 1 wherein the step of controlling comprises determining a pumped fuel quantity based on the spilled fuel quantity.

3. The method of claim 1 wherein the step of controlling comprises controlling a proportioning valve disposed upstream of a fuel pump supplying fuel to the common rail.

4. The method of claim 1 wherein the step of determining a spilled fuel quantity comprises accessing a lookup table based on the engine speed and rail pressure.

5. The method of claim 1 wherein the step of controlling pressure comprises providing a feed forward open loop setpoint using the spilled fuel quantity.

6. The method of claim 5 further comprising:
   determining a quantity of injected fuel;
   wherein the feed forward open loop setpoint is determined based on the injected fuel and the spilled fuel.

7. The method of claim 1 wherein the spilled fuel quantity comprises a first component based on the rail pressure and a second component based on the rail pressure and energizing time.

8. A method for controlling a multiple cylinder internal combustion engine having a common rail fuel distribution system, the method comprising:
   determining injector energizing time;
   determining rail pressure;
   determining a leaked fuel quantity based on the rail pressure;
   determining a control fuel quantity based on the rail pressure and the injector energizing time; and
   controlling pressure within the common rail fuel distribution system using the leaked fuel quantity and the control fuel quantity.

9. The method of claim 8 further comprising determining an injected fuel quantity, wherein the step of controlling pressure includes controlling pressure based on the leaked fuel quantity, the control fuel quantity, and the injected fuel quantity.

10. The method of claim 9 wherein the step of controlling pressure comprises determining a pump output based on the leaked fuel quantity, the control fuel quantity, and the injected fuel quantity.

11. The method of claim 8 wherein the step of controlling comprises controlling a proportioning valve disposed upstream of a fuel pump supplying fuel to the common rail.

12. The method of claim 8 wherein the step of determining a leaked fuel quantity comprises accessing a lookup table based on the rail pressure.

13. The method of claim 8 wherein the step of determining a control fuel quantity comprises accessing a lookup table based on the rail pressure and the injector energizing time.

14. A computer readable storage medium having stored data representing instructions executable by a computer to control a multiple cylinder internal combustion engine having a common rail fuel distribution system, the computer readable storage medium comprising:
   instructions for determining rail pressure;
   instructions for determining a spilled fuel quantity based on at least the rail pressure; and
   instructions for controlling pressure within the common rail fuel distribution system using the spilled fuel quantity.

15. The computer readable storage medium of claim 14 further comprising instructions for determining a spilled fuel quantity based on a control fuel quantity and a leaked fuel quantity.

16. The computer readable storage medium of claim 15 further comprising instructions for determining injector energizing time, wherein the control fuel quantity is determined based on the injector energizing time and the rail pressure, and the leaked fuel quantity is determined based only on the rail pressure.

17. The computer readable storage medium of claim 14 further comprising:
   instructions for determining an injected fuel quantity; and
   wherein the instructions for controlling pressure include instructions for controlling pressure based on the injected fuel quantity and the spilled fuel quantity.

18. The computer readable storage medium of claim 14 further comprising:
   instructions for determining engine speed;
   wherein the instructions for determining a spilled fuel quantity include instructions for determining a spilled fuel quantity based on the engine speed and the rail pressure.

19. The computer readable storage medium of claim 14 further comprising instructions for controlling a proportioning valve to control the pressure.

20. A system for controlling a common rail fuel distribution system of a multi-cylinder internal combustion engine having a fuel injector associated with each cylinder and coupled to a common fuel rail, the system comprising:
   a pump coupled to the common fuel rail;
   a pressure sensor coupled to the common fuel rail for providing a signal indicative of pressure within the rail; and
   a controller in communication with the pressure sensor, the pump, and the injectors, the controller determining a quantity of spilled fuel based at least in part on the signal indicative of pressure within the rail and controlling the pump based on the spilled fuel to control pressure within the common fuel rail.

21. The system of claim 20 further comprising an engine speed sensor in communication with the controller, wherein the controller determines the spilled fuel based on a signal from the engine speed sensor and the signal indicative of pressure within the rail.

22. The system of claim 20 wherein the controller determines the quantity of spilled fuel based on a quantity of leaked fuel with the leaked fuel determined based only on the pressure within the rail.

23. The system of claim 20 wherein the controller determines the quantity of spilled fuel based on a quantity of control fuel used to actuate the injectors with the control fuel determined based on the pressure within the rail and injector energizing time.

24. The system of claim 20 wherein the controller determines pump output based on a quantity of injected fuel and the quantity of spilled fuel with the quantity of spilled fuel determined using a first lookup table accessed based on rail pressure to determine a leak quantity and a second lookup table accessed based on rail pressure and injector energizing time to determine a control quantity.

* * * * *